US007373476B2

(12) United States Patent
Asano et al.

(10) Patent No.: US 7,373,476 B2
(45) Date of Patent: May 13, 2008

(54) SYSTEM AND METHOD FOR CONFIGURATION MANAGEMENT OF STORAGE SYSTEM

(75) Inventors: Masayasu Asano, Yokohama (JP); Takayuki Nagai, Yokohama (JP); Yasuyuki Mimatsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 2 days.

(21) Appl. No.: 10/889,850

(22) Filed: Jul. 12, 2004

(65) Prior Publication Data
US 2005/0283583 A1 Dec. 22, 2005

(30) Foreign Application Priority Data
May 11, 2004 (JP) ............................. 2004-140619

(51) Int. Cl.
*G06F 12/00* (2006.01)
(52) U.S. Cl. ...................................... 711/173; 711/114
(58) Field of Classification Search ................ 711/148, 711/150, 152, 154, 163, 164, 173; 707/9, 707/10
See application file for complete search history.

(56) References Cited

U.S. PATENT DOCUMENTS

| | | | | |
|---|---|---|---|---|
| 5,797,128 A | * | 8/1998 | Birnbaum ...................... 707/5 |
| 5,822,518 A | * | 10/1998 | Ooki et al. ..................... 726/6 |
| 5,940,591 A | * | 8/1999 | Boyle et al. .................... 726/3 |
| 6,260,120 B1 | * | 7/2001 | Blumenau et al. ........... 711/152 |
| 6,425,049 B1 | * | 7/2002 | Yamamoto et al. .......... 711/112 |
| 6,484,173 B1 | | 11/2002 | O'Hare et al. |
| 6,631,442 B1 | * | 10/2003 | Blumenau .................... 711/112 |
| 6,640,278 B1 | * | 10/2003 | Nolan et al. .................... 711/6 |
| 6,647,387 B1 | | 11/2003 | McKean et al. |
| 6,728,888 B2 | * | 4/2004 | Ooki et al. ...................... 726/7 |
| 6,754,718 B1 | * | 6/2004 | Dobberpuhl et al. ......... 709/250 |
| 6,766,397 B2 | * | 7/2004 | O'Hare et al. ............... 710/200 |
| 6,910,041 B2 | * | 6/2005 | Exton et al. ..................... 707/9 |
| 6,952,698 B2 | * | 10/2005 | Delaire et al. ................ 707/10 |
| 2002/0099914 A1 | * | 7/2002 | Matsunami et al. ......... 711/154 |
| 2002/0143942 A1 | | 10/2002 | Li et al. |
| 2003/0014600 A1 | * | 1/2003 | Ito et al. ...................... 711/152 |

(Continued)

FOREIGN PATENT DOCUMENTS

JP    2001184175 A    12/1999

OTHER PUBLICATIONS

U.S. Appl. No. 10/765,883, filed Jan. 29, 2004.

*Primary Examiner*—Matthew Kim
*Assistant Examiner*—Ryan Dare
(74) *Attorney, Agent, or Firm*—Townsend and Townsend and Crew LLP

(57) ABSTRACT

A discrepancy between a management range of a user on a management computer, and a management range of the user in a storage, is detected with respect to a volume held in the storage. Storage management information of the management computer stores a correspondence between an identifier of a volume group, and an identifier of the user. When a plurality of volumes are designated as a managed object of the user, the management computer references the storage management information, and obtains, from the storage, an identifier of the volume group to which the plurality of designated volumes belong. Next, the management computer references the storage management information, and determines whether or not the obtained volume group is in the management range of the same user.

23 Claims, 12 Drawing Sheets

U.S. PATENT DOCUMENTS

| | | |
|---|---|---|
| 2003/0172069 A1 | 9/2003 | Uchiyama et al. |
| 2003/0208589 A1 | 11/2003 | Yamamoto |
| 2003/0225934 A1* | 12/2003 | Kaji et al. ................. 709/325 |
| 2004/0243772 A1* | 12/2004 | Wissenbach ................ 711/152 |
| 2005/0120171 A1* | 6/2005 | Yasukawa et al. .......... 711/114 |
| 2005/0283583 A1* | 12/2005 | Asano et al. ............... 711/170 |

* cited by examiner

FIG.2

STORAGE CONSTRUCTION INFORMATION 125

STORAGE ID (200, 201)

| STORAGE ID |
|---|
| 1 |

VOLUME TABLE (210, 211, 212)

| STORAGE VOLUME GROUP ID | VOLUME ID |
|---|---|
| 1 | 1 |
| 1 | 2 |
| 2 | 3 |
| 2 | 4 |
| 3 | 5 |
| 3 | 6 |
| 4 | 7 |
| 5 | 8 |
| 6 | 9 |

CACHE PARTITION TABLE (220, 221, 222)

| CACHE PARTITION ID | MEMORY ADDRESS RANGE |
|---|---|
| 1 | FROM 0 TO 0xFFFF |
| 2 | FROM 0x10000 TO 0x1FFFF |
| 3 | FROM 0x20000 TO 0x2FFFF |

PORT TABLE (230, 231)

| PORT ID |
|---|
| 1 |
| 2 |
| 3 |
| 4 |

STORAGE PARTITION TABLE (240, 241, 242, 243)

| STORAGE PARTITION GROUP ID | CONSTITUTIVE ELEMENT | CONSTITUTIVE ELEMENT ID |
|---|---|---|
| 1 | STORAGE VOLUME GROUP ID | 4 |
| 1 | STORAGE VOLUME GROUP ID | 5 |
| 1 | PORT ID | 1 |
| 1 | CACHE PARTITION ID | 1 |
| 2 | STORAGE VOLUME GROUP ID | 3 |
| 2 | PORT ID | 2 |
| 2 | CACHE PARTITION ID | 2 |
| 3 | STORAGE VOLUME GROUP ID | 6 |

USER TABLE (250, 251, 241)

| USER ID | STORAGE PARTITION GROUP ID |
|---|---|
| 3 | 3 |
|   |   |

200: STORAGE IDENTIFICATION TABLE
210: VOLUME TABLE
220: CACHE PARTITION TABLE
230: PORT TABLE
240: STORAGE PARTITION TABLE
250: USER TABLE

FIG.3

113 STORAGE MANAGEMENT INFORMATION

300 / 301 / 201 / 212

| MANAGEMENT GROUP ID | STORAGE ID | VOLUME ID |
|---|---|---|
| 1 | 1 | 1 |
| 1 | 1 | 2 |
| 1 | 1 | 3 |
| 2 | 1 | 4 |
| 2 | 2 | 1 |
| 3 | 2 | 2 |
| 3 | 3 | 1 |

310 / 301 / 312

| MANAGEMENT GROUP ID | HOST ID |
|---|---|
| 1 | 1 |
| 1 | 2 |
| 2 | 3 |
| 3 | 4 |

320 / 301 / 251

| MANAGEMENT GROUP ID | USER ID |
|---|---|
| 1 | 1 |
| 2 | 2 |
| 3 | 2 |

330 / 251 / 201 / 241

| USER ID | STORAGE ID | STORAGE PARTITION GROUP ID |
|---|---|---|
|  |  |  |
|  |  |  |
|  |  |  |

340 / 312 / 342

| HOST ID | HOST IDENTIFICATION INFORMATION |
|---|---|
| 1 | 10.10.10.10.10.10.10.10 |
| 2 | 20.20.20.20.20.20.20.20 |
| 3 | 30.30.30.30.30.30.30.30 |
| 4 | 40.40.40.40.40.40.40.40 |

300: VOLUME MANAGEMENT GROUP TABLE
310: HOST MANAGEMENT GROUP TABLE
320: USER MANAGEMENT GROUP TABLE
330: USER STORAGE PARTITION TABLE
340: HOST INFORMATION TABLE

| MANAGEMENT GROUP ID | STORAGE ID | PORT ID |
|---|---|---|
| 1 | 1 | 1 |
| 1 | 1 | 2 |
| 1 | 1 | 3 |
| 2 | 1 | 4 |
| 2 | 2 | 1 |
| 3 | 2 | 2 |
| 3 | 3 | 1 |

910 301 201 221

| MANAGEMENT GROUP ID | STORAGE ID | CACHE PARTITION ID |
|---|---|---|
| 1 | 1 | 1 |
| 1 | 1 | 2 |
| 2 | 1 | 3 |
| 2 | 2 | 1 |
| 3 | 2 | 2 |
| 3 | 3 | 1 |

900: PORT MANAGEMENT GROUP TABLE
910: CACHE PARTITION MANAGEMENT GROUP TABLE

SYSTEM AND METHOD FOR CONFIGURATION MANAGEMENT OF STORAGE SYSTEM

CROSS-REFERENCE TO RELATED APPLICATION(S)

This application relates to and claims priority from Japanese Patent Application No. 2004-140619, filed on May 11, 2004, the entire disclosure of which is incorporated herein by reference.

This application also relates to U.S. patent application Ser. No. 10/765,883 filed on Jan. 29, 2004, and U.S. patent application Ser. No. 10/229,130 filed on Aug. 28, 2002, the entire disclosure of each being incorporated herein by reference.

BACKGROUND OF THE INVENTION

The present invention relates to a technique for managing the configuration of a data area of a storage system, and more particularly to a technique for detecting a discrepancy in the range of a data area set by a management computer, and in the range of the data management area set inside a storage system.

In computer systems operated and managed by corporations and the like, computer systems have been developed that use large-capacity storage and multiple storage devices connected by a Storage Area Network (SAN) where the multiple storage devices are generally connected by a fibre channel and Internet Protocol (IP)dedicated for use with storage. SANs have caused an increase of computer systems in which multiple computers share voluminous data dispersed across the storage devices. Furthermore, since an objective of manufacturers has been to improve the utility of storage devices and the like, storage performance is being improved. In a computer system such as described above, an increase in the data to be managed complicates the operation and management of storage and increases costs. Therefore, a technique has been proposed for partitioning the management range of the user who manages both the storage devices in a storage network and the large-capacity storage component of the system (e.g., JP 2003-330622 A, *Official Gazette* (corresponds to U.S. application No. 2003/0172069 A1).

In U.S. application No. 2003/0172069 A1, the volume accessible to a user or a host is assigned, and a right to manage the volume is set. This technique enables clarification of the user's management range for each volume. A known technique improves access performance to the volume and increases the volume's usage efficiency, thereby reconstructing the storage system (e.g., JP 2001-184175 A, *Official Gazette*). This technique enables efficient handling of volumes in large-capacity storage without waste.

The above-mentioned conventional techniques have the following problems. The conventional technique in JP 2001-184175 A does not discuss rights with respect to the volume in storage. In large-capacity storage, many cases where the volumes that can be used are determined separately for each department or business service. Therefore, when reconstructing the volume to improve system performance, with the technique of JP 2001-184175, the rights to the volume are not managed, and concern arises that without the permission of the volume manager the configuration of the volume will be improperly changed. Therefore, a system is needed which manages the rights to the volume.

The conventional technique in JP 2003-330622 A can sometimes resolve the foregoing problem. However, the user's management range is set on the computer that manages the storage system. Therefore, if this management computer can be bypassed to set the storage system ranges, the management range set on the management computer becomes invalid. Accordingly, even within the storage system access to the volume must be restricted. In order to restrict overall access to the storage system, it is also necessary to restrict access on the management computer. Thus, the access restrictions configured on the management computer, and the access restrictions configured within the storage system, must match each other, which can be a problem.

When storage constitutes a RAID structure, multiple volumes generally belong to a single RAID structure. Therefore, if the volumes belonging to the same RAID structure are partitioned between two users, when a disk in the RAID structure fails, failure information must be sent to both users, and ultimately the volumes belonging to the same RAID structure must be managed by both users. Therefore, clearer management ranges can generally be achieved by dividing user management rights for each RAID structure unit.

As mentioned above, there is a tendency restrict access by each logical volume unit on the management computer, and by each RAID structure rather than by each volume in the storage system. In this case, the management range on the management computer, and the management range in the storage system, do not match. For example, when the storage system has two RAID disk groups, such as one volume of a RAID 1 structure and one volume of a RAID 5 structure, if a volume group belonging to a volume in the RAID 1 structure and a volume belonging to the RAID 5 structure are given to a user by the management computer, and another volume in the RAID 5 structure is given to another user, then the management ranges of the users are clearly divided when seen in terms of volume units. However, in terms of RAID structure units, two users manage the RAID of the RAID 5 structure, creating a state where the management range is unclear.

BRIEF SUMMARY OF THE INVENTION

Within a storage device, an inseparable storage area is set with respect to a storage manager. This storage area constitutes a group aggregating multiple storage area units (e.g., volumes). In contrast, within a management computer, a storage area is set within a management range of a storage manager. A multiplicity of the above-mentioned storage area units constitute this storage area. One embodiment of the present invention detects whether a multiplicity of the storage area units, or at least one of the groups designated as a managed object, are in the management range of the same manager in both the storage and the management computer.

Other characteristics of the present invention are clarified by the detailed description of the invention and the attached diagrams.

BRIEF DESCRIPTION OF THE DRAWINGS

FIG. 2 is a diagram of exemplary tables provided in a storage according to an embodiment;

FIG. 3 is a diagram of exemplary tables provided in a management computer according to an embodiment;

FIG. 9 is a diagram showing construction of exemplary tables for managing device partitions according to a fourth embodiment;

DETAILED DESCRIPTION OF THE INVENTION

Hereinafter, detailed explanation of the embodiments of the present invention is presented with reference to the diagrams.

Figure 1:
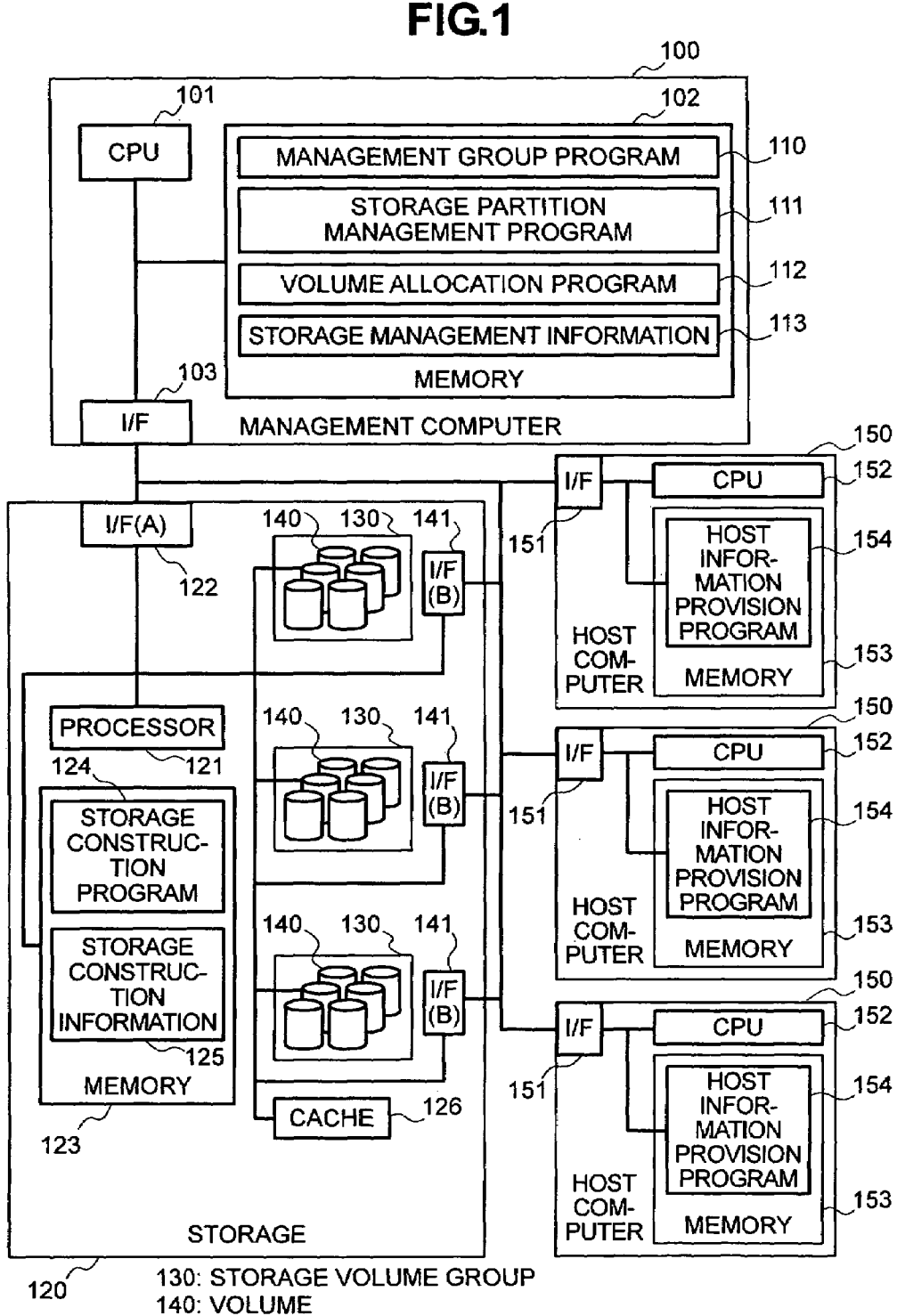
FIG. 1 is a diagram showing a configuration of a storage device configuration management system according to an embodiment.

FIG. 1 is a diagram showing an exemplary configuration of a storage device configuration management system according to the first through a fourth embodiments of the present invention. The storage device management system has at least one storage system 120, a plurality of host computers 150, a computer 100, and a communications route connecting these devices.

Storage system 120 has a storage control device and a storage drive device, and constitutes a storage system. Hereinafter, this storage system is abbreviated as storage 120. Storage 120 includes an interface (I/F)(B) 141 for sending/receiving data I/O relating to reading and writing to/from volumes 140, which are storage areas storing data managed by a computer; an I/F (A) 122 that communicates with management computer 100 and the like, a processor 121 that executes storage control, and a memory 123. I/F (B) 141 and I/F (A) 122, depending on the communications format (e.g., IP), may be arranged as a single communications device.

A storage volume group 130 corresponds to a group of physical storage drives, and is a unit managed by storage 120, which aggregates volumes 140 in a group. Here, a volume is a logical storage area unit existing in storage 120. For example, in a case of a storage system that can create a RAID structure, an aggregate of disks capable of forming the RAID structure are treated as a single storage volume group, and by creating the RAID volume inside the storage volume group, this environment can be created. The case of storage volume group 130, as in the above-mentioned example, is sometimes referred to as a parity group, a RAID group, or the like. At least one storage volume group 130 constitutes an inseparable storage area for the manager.

A storage structuring program 124 and storage configuration information 125 are stored in memory 123. Storage structuring program 124 is executed by processor 121. Storage structuring program 124 manages allocation of storage volume group 130 and volume 140 of storage 120, and managing partitions resources within the storage system. Storage configuration information 125 is configuration information about volume 140 and storage volume group 130. A cache 126 is a memory used to accelerate volume access. In one embodiment, there is provided a program stored in a computer-readable storage medium. A computer-readable storage medium is implemented using hardware. One example of a computer-readable storage medium can be a physical storage device.

Management computer 100 is provided with a CPU 101, a memory 102, and an I/F 103 for communicating with storage 120 or a host 150. A management group program 110, a storage partition management program 111 and a volume allocation program 112 realize the processing of the embodiments of the present invention. Management group program 110, storage partition management program 111 and volume allocation program 112 are stored in memory 102 of management computer 100, and are executed by CPU 101. Storage management information 113 is information used by management group program 110, storage partition management program 111 and volume allocation program 112.

Host computer 150 uses storage 120, sends and receives data I/O via I/F 151, and reads and writes data to/from volume 140 in storage 120. Host computer 150 is provided with an I/F 151, a CPU 152 and a memory 153. Memory 153 in host computer 150 stores a host information provision program 154. Host information provision program 154 is executed by CPU 152, and sends host identification information and other information relating to the security of storage 120 to management computer 100. I/F 151 is connected to management computer 100 and storage 120. For sending and receiving information to/from management computer 100, when a protocol such as TCP/IP is used for transmission/ reception of information to/from management computer 100, and a protocol such as fibre channel is used for storage 120; that is, when separate protocols are used for both communications, separate I/Fs may be used. For example, when management computer 100 and storage 120 use the same protocol for sending and receiving the data of host computer 150, I/F 151 may be composed of a single I/F device.

FIG. 2 is a diagram showing example constructions of each table of the storage configuration information 125 in the storage 120, in accordance with the first through fourth embodiments of the present invention. The storage configuration information 125 is used by the storage structuring program 124.

Next, storage partitioning is defined. This is partitioning of resources, where the resources (e.g., volume) of the storage 120 is divided per managed object and assigned to a user who manages each managed object, whereby a plurality of managers can independently manage the resources within the storage. When the storage is thus partitioned, the manager of large-scale storage does not have to manage the whole system by him or herself, rather the resources to be managed can be assigned to other managers. Furthermore, the managed objects are assigned to each manager independently, which eliminates the influence of management overlap and operational errors. Storage configuration information 125 is used to manage the storage partitioning.

The disclosure of U.S. patent application Ser. No. 10/765, 883 filed on Jan. 29, 2004, is cited to support this application including the partitioning and allocating of resources. A storage identification table 200 has information management computer 100 or host 150 uses to identify the storage 120. A storage ID 201 is stored as an identifier for identifying storage 120.

Volume table 210 stores information of storage volume group ID 211, which is an identifier for storage volume group 130 in storage 120, and a volume ID 212, which is the identification for volume 140 in storage 120. The example of volume table 210 shows that volumes having volume IDs of "1" and "2" belong to the storage volume group having the storage volume group ID of "1".

A cache partition table 220 stores a cache partition ID 221 and information about a memory address range 222 that can be used by partitioning the cache. Table 220 enables information about the partitioned cache to be managed.

A port table 230 holds information needed for management computer 100 and host computer 150 to identify each I/F (B) 141 of storage 120, and stores port IDs 231, the identifiers for each of the I/Fs (B) 141. A storage partition table 240 stores configuration information for partitioning resources in the storage, so that the plurality of managers can manipulate storage 120.

Storage partition table 240 includes a storage partition group ID 241, a constitutive element 242 indicating the resource in the storage partitioning, and a constitutive element ID 243 which is an identification for the constitutive element. For example, as a resource being storage partitioned, a storage partition with storage partition group ID of "1" has a resource where the storage volume group IDs are "4" and "5", the port ID is "1", and the cache partition ID 221 is "1".

A user table 250 stores a user ID 251, an identifier for a user registered in storage 120, and storage partition group ID 241 showing the unit of the storage partitioning accessible to the user. This information enables management the storage partition group(s) the storage 120 manager can access. Here, the example of user table 250 indicates that a user having a user ID "3" has access where the storage partition group ID is "3". This means the user is able to access the resources of storage volume group 6. The other resources cannot be accessed from the user with ID "3". Furthermore, if the user managing the storage partition group ID "1" is registered in user table 250, this user can access the resources of storage volume group with IDs "4" and "5", the port ID "1" and the cache partition ID "1".

In the above-mentioned example, the storage partitioned resources are given to each user. However, as shown for storage partition group ID "2", when no user ID is registered, all the users can have access. Furthermore, the storage resources as a whole can be set for a user to access without using the user table, such as an overall manager of storage resources.

As described above, by partitioning the resources in the storage, the storage resource managers can be clarified, and the management ranges can be divided.

FIG. 3 is a diagram of exemplary constructions of each table of storage management information 113 used by each program executed by management computer 100 in accordance with the embodiments of the present invention. Storage management information 113 includes a volume management group table 300, a host management group table 310, a user management group table 320, a user storage partition table 330, and a host information table 340, which are used by management group program 110.

Next, the "group" referred to in "the management group" is defined. The "management group" refers to a unit for grouping and managing certain resources. The resources shown in FIG. 3 are volumes and host computers. By grouping the volumes and the host computers, the manager of the group can grant a right to assign a path to the volume and configure path security with respect to the volumes in that group and with respect to the host computer, etc. The manager cannot manipulate volumes which are not registered in his or her own management group. The disclosure of U.S. patent application Ser. No. 10/229130 filed on Aug. 28, 2002 is cited to support this application, including grouping resources and granting a right.

Next, explanation is given regarding each table in storage management information 113. Volume management group table 300 stores a management group ID 301, an identifier for the management group; storage ID 201 of storage 120 managed by management computer 100; and volume ID 212 of volume 140 in storage 120. According to the example of volume management group table 300, the manager of management group ID "1" can manipulate and obtain information only for a volumes with volume IDs of "1", "2" and "3". When displaying the information about this management group, as management group ID "1", only information about volumes with the volume IDs of "1", "2" and "3" is shown.

Host management group table 310 stores management group ID 301, and a host ID 312, an identifier of host computer 150 managed in the management computer. This table defines the host computer handled by the management group. For example, according to host management group table 310, the manager of management group ID "1" can perform manipulations where the host IDs are "1" and "2".

User management group table 320 stores the management group ID 301 and the user ID 251 indicating the manager of the management group. User storage partition table 330 stores user ID 251 showing the manager of the storage partition; storage ID 201 of the managed object; and storage partition group ID 241, which is the identifier of the storage partition group in the storage.

Host information table 340 stores host ID 312; and host identification information 342, which is used when setting the host computer information for storage 120. For example, when I/F 151 of host 150 and I/F (B) 141 of storage 120 are connected to each other by a fibre channel connection, then host identification information 342 is set as the World Wide Name (WWN), which is the identifier on the fibre channel. Host information provision program 154 uses the host identification information to configure security information for the volume(s) accessible by the host computer, for example.

When the table included in storage configuration information 125 is set inside the storage management information 113, the processing performed when accessing these tables is accelerated. For example, the information in the storage partition table 240 may be set in the storage partition table 240 for the storage ID "1", or may be set inside the storage management information 113.

Figure 4:
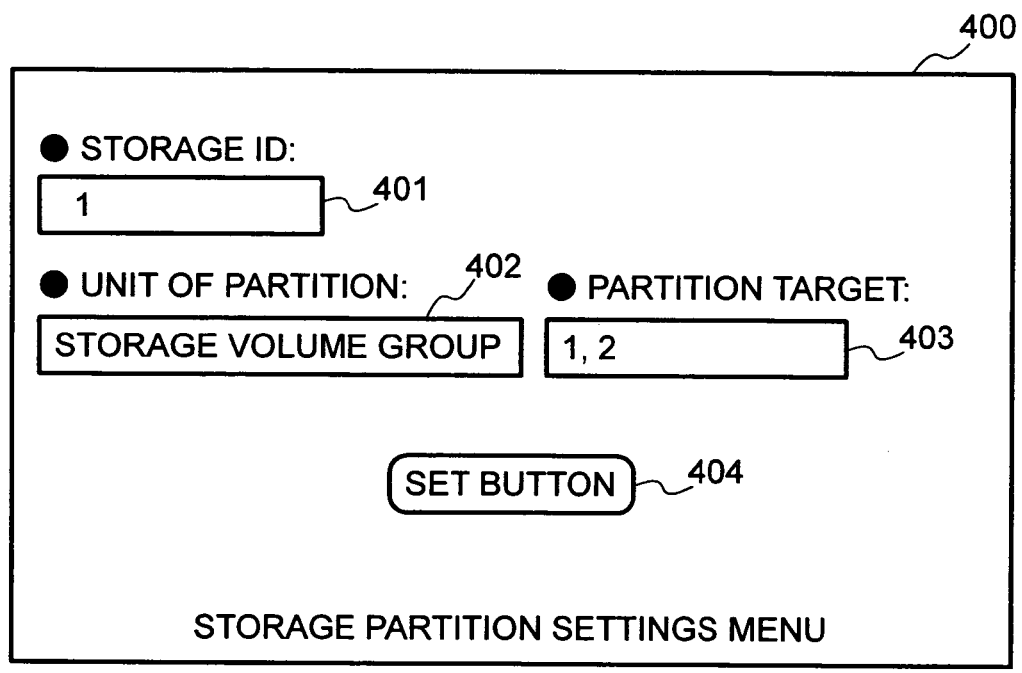
FIG. 4 shows an example of a guidance screen for storage partition designation, according to an embodiment.

FIG. 4 is an example of a guidance screen used for designating the storage partition, according to the first and third embodiments. A storage partition settings menu 400 is displayed on a display device of management computer 100. The guidance screen of storage partition settings menu 400 includes a storage ID area 401 showing an identifier of the storage being partitioned, a partition unit area 402 showing the units by which the partitioning is being performed, and a partition target area 403 showing which resource in the partition unit to designate as the storage partition unit.

For example, as shown in FIG. 4, when storage ID "1" is partitioned by storage volume group units, the ID of the storage volume group that will be registered is designated for partition target area 403. FIG. 4 shows a case where storage volume groups whose storage volume group IDs are "1" and "2" in a storage component whose ID is "1" and is designated as the resource for the storage partition. A value of this area is an example of an input in processing shown in 5, which is explained next.

Furthermore, the guidance screen in FIG. 4 may be configured to designate the port and the cache partition in addition to the storage volume group. That is, partition unit area 402 can also display port and/or cache partition menus, and partition target area 403 can also set the ID of a selected resource. When a set button 404 is pressed, management computer 100 may register all the information about the volume, the port and the cache partition all at once as input values. Furthermore, the display area may also be expanded to set a multiple storage partitions. That is, the storage partition settings menu 400 may be provided with a plurality of sets of display areas for areas 401, 402, 403, and when set button 404 is pressed, these sets of information may be inputted into storage partition management program 111 all at once.

Figure 5:
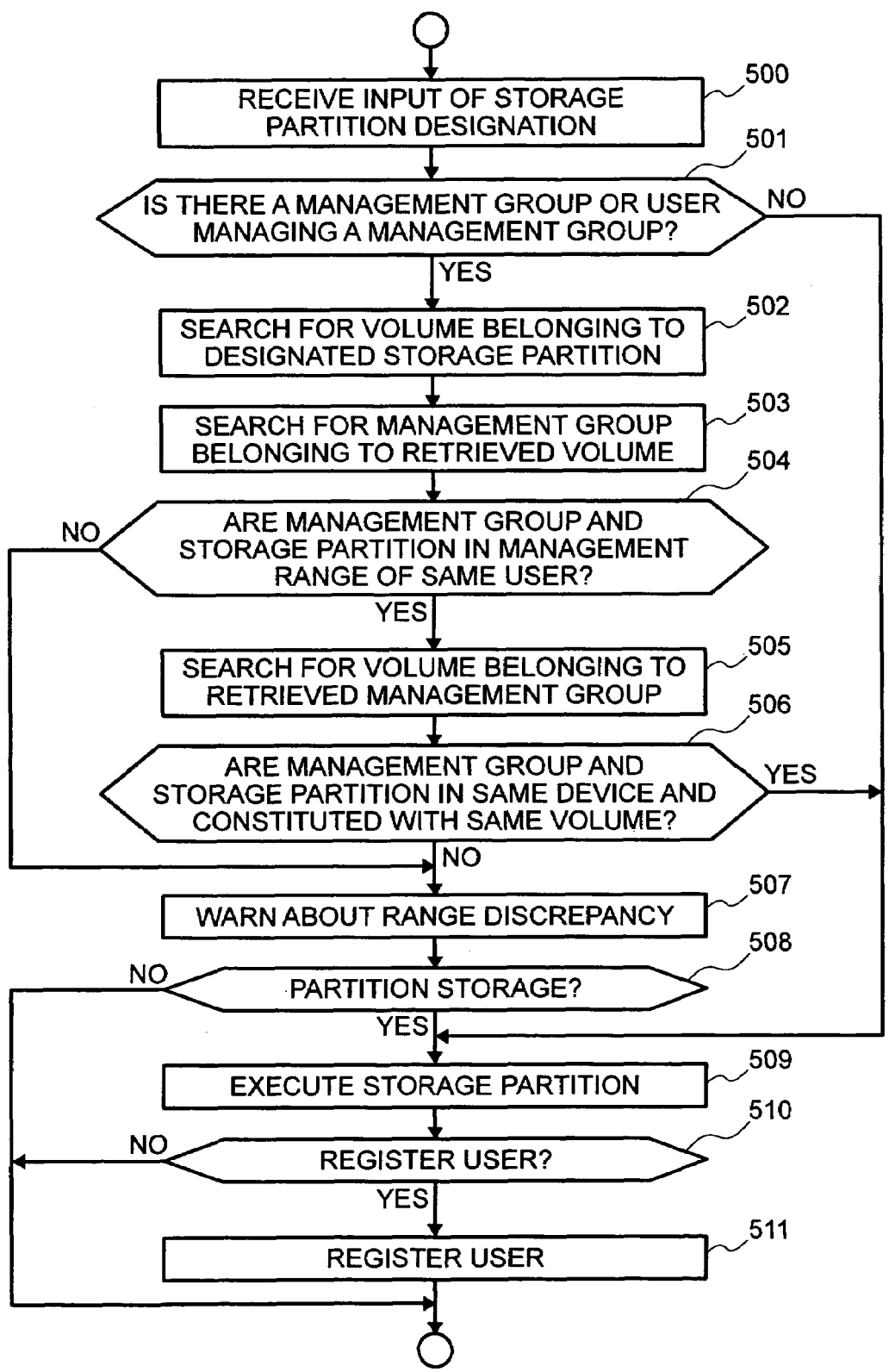
FIG. 5 is a flowchart of the process for detecting a volume management range mismatch, according to a first embodiment.

FIG. 5 is a flowchart, according to the first embodiment of the present invention, showing an exemplary sequence of processing for detecting a mismatch between the volume management range on management computer 100, and the volume management range produced by storage partitioning inside storage 120. The processing shown in the flowchart is included in management group program 110 and storage partition management program 111. The example of the processing shown in FIG. 5 shows a sequence of processing performed when the management group information has been set in advance to detect a mismatch between the management ranges.

Storage partition management program 111 executes processing at step 500 and step 509, and management group program 110 executes processing at the other steps.

Storage partition management program 111 receives the input of the storage partition designation via the guidance screen such as shown in FIG. 4 (step 500). Next, it is determined whether the management group exists on the management computer, or which user is managing the management group (step 501). At step 501, if values are present in management group ID 301 in volume management group table 300, in management group ID 301 in host management group table 310, and in management group ID 301 in user management group table 320, then it is determined that the management group does exist. Which user is managing the management group is determined by whether values are present in management group ID 301 and user ID 251 in user management group table 320. If the management group does exist, or if the management group is being managed by a user, then the processing advances to step 502. If not, then step 509 is next.

Next, management group program 110 obtains, from volume table 210, the volume ID belonging to the storage volume group that is undergoing the storage partitioning designated at step 500 (step 502). Management group program 110 communicates via I/F 103 and I/F 122 with storage structuring program 124 of storage 120 to obtain information from volume table 210 in storage configuration information 125. For example, according to the designation shown in FIG. 4, the values in storage volume group 130 for storage ID "1" are designated "1" and "2", so the volume IDs obtained here are "1", "2", "3" and "4". Furthermore, in step 502, if the designated storage volume group is already being used in storage partitioning, this is may be displayed as a message and the processing may end, since the designated storage partitioning cannot be configured.

Next, management group program 110 obtains the management group belonging to volume obtained from the volume management group table 300 at step 502 (step 503). For example, volumes with volume IDs "1", "2", "3" and "4" of storage ID "1" are obtained in the example of step 502, so the IDs of the management groups belonging to these volumes are "1" and "2".

Next, management group program 110, based on the volume information obtained at step 502 and the management group information obtained at step 503, the investigates whether the management group and the storage partition group is managed by the same user (step 504). Management group program 110 investigates whether the designated storage partition group and the management group have the same user. If, for that storage partition group, the management group user is different, then it is judged that there is no user managing the volume belonging to that storage partition group. This situation indicates a mismatch has occurred between the management range of the storage partition and the management range of the management group. If the same user manages the storage partition, then the management ranges are judged to match, and the processing advances to step 505. If management is not performed by the same user, then the management ranges are judged to be mismatched, and the processing advances to step 507.

For example, according to step 503, the obtained IDs of the management groups are "1" and "2". Therefore, when referencing the information in user management group table 320, since management group ID "1" and management group ID "2" are managed by different users, the management ranges do not match, and processing advances to step 507. When the users of management groups "1" and "2" are the same, processing advances to step 505.

Next, management group program 110 obtains from volume management group table 300 the volumes that belong to the management groups obtained at step 503 (step 505). For example, at step 503, the obtained management group IDs were "1" and "2", so the volumes belonging to these management groups are volumes "1", "2", "3" and "4" for storage ID "1", and volume "1" for storage ID "2".

Next, based on the volume information obtained at step 502 and the volume information obtained at step 505, the management program investigates whether the volume belonging to the management group and the volume belonging to the storage partition are in the same storage component and are provided by the same volume (step 506). If they are the same, the management ranges match and processing advances to step 509. If they are different, the management ranges do not match and processing advances to step 507. For example, in a case where, at step 503, management group IDs "1" and "2" have the same user, and the volume information obtained at steps 505 and 502 were for volume IDs "1", "2", "3" and "4", the volume IDs belonging to management group ID "1" and management group ID "2" are for volume IDs "1", "2", "3" and "4" of storage ID "1". Thus the management ranges match each other, and processing advances to step 509.

At step 507, management group program 110 determines that the management ranges of the storage partition (designated from the processing steps up to step 506) and the existing management group do not match, and then outputs the determination result by displaying a warning or the like. Accordingly, the user is made aware that the designated storage partition cannot be made to match the management range. Furthermore, when outputting the determination result from step 507, it is possible to show the user the ID of the volume belonging to the storage volume group designated in the storage partitioning, and the volume ID belonging to the management group obtained at step 503. This display can serve as a guideline the next time the user configures the storage partition.

At step 508, the user is queried, via the display device of management computer 100, whether to partition the storage. This query reconfirms whether to perform the storage partition to modify the storage configuration even through the environment is such that the management ranges of the management groups will be different if the storage partition of the processing up to step 507 is performed. If the user instructs performance of storage partition, processing advances to step 509; if not, processing ends.

At step 509, the storage partition management program 111 performs the actual storage partition processing. The processing at this step delivers a request from storage partition management program 111 through I/F 103 and I/F 122 to storage structuring program 124 of storage 120, and then the actual storage partition processing is performed.

At step 510, management group program 110 has the user select whether or not to perform user registration with respect to storage partition. If the user instructs performance of user registration with respect to the designated storage partition, processing advances to step 511; if not, processing ends.

At step 511, management group program 110 registers the user that manages the storage partition into user management group table 320 and into user table 250 in storage 120. Furthermore, management group program 110 registers the configuration of the new storage partition group into storage partition table 240 via storage structuring program 124, and then registers the correspondence between the user and the storage partition group into user storage partition table 330. After these are registered, processing ends.

In the first embodiment of the present invention, when, by a route other than management computer 100, the storage partition is configured by a computer other than management computer 100 or the storage itself, if a mismatch is discovered between the management-computer-side management range managed by management computer 100 and the storage-side management range, the determination result may be outputted by emitting a warning or the like. Furthermore, by contrast, when the manipulation of the storage has been performed, a notification that the storage partition was performed may be made to management computer 100. Furthermore, when this notification is received by management group program 110 of management computer 100, if a mismatch is discovered between the management-computer-side management range and the storage-side management range, then the warning may be emitted.

According to the first embodiment, the discrepancy between the storage partition and the management group management range is determined, and this determination lets the user select the processing, whereby notification of the proper match between management ranges can be sent to the user.

When the identifier of the host computer is registered for the management group involved in storage partition, a warning may also be emitted when a mismatch occurs between the definition of the management group's host and the definition of the host of the storage partition. For example, it is assumed here that storage configuration information 125 is provided with a table defining a correspondence between storage partition group ID 241 and host ID 312. Since storage management information 113 has host management group table 310, the warning may also be emitted when management range mismatch occurs between host computer 150 defined in the storage partition and host computer 150 defined in management computer 100. Instead of sending the warning message to the user of management computer 100, the warning may be sent to host computer 150.

Figure 6:
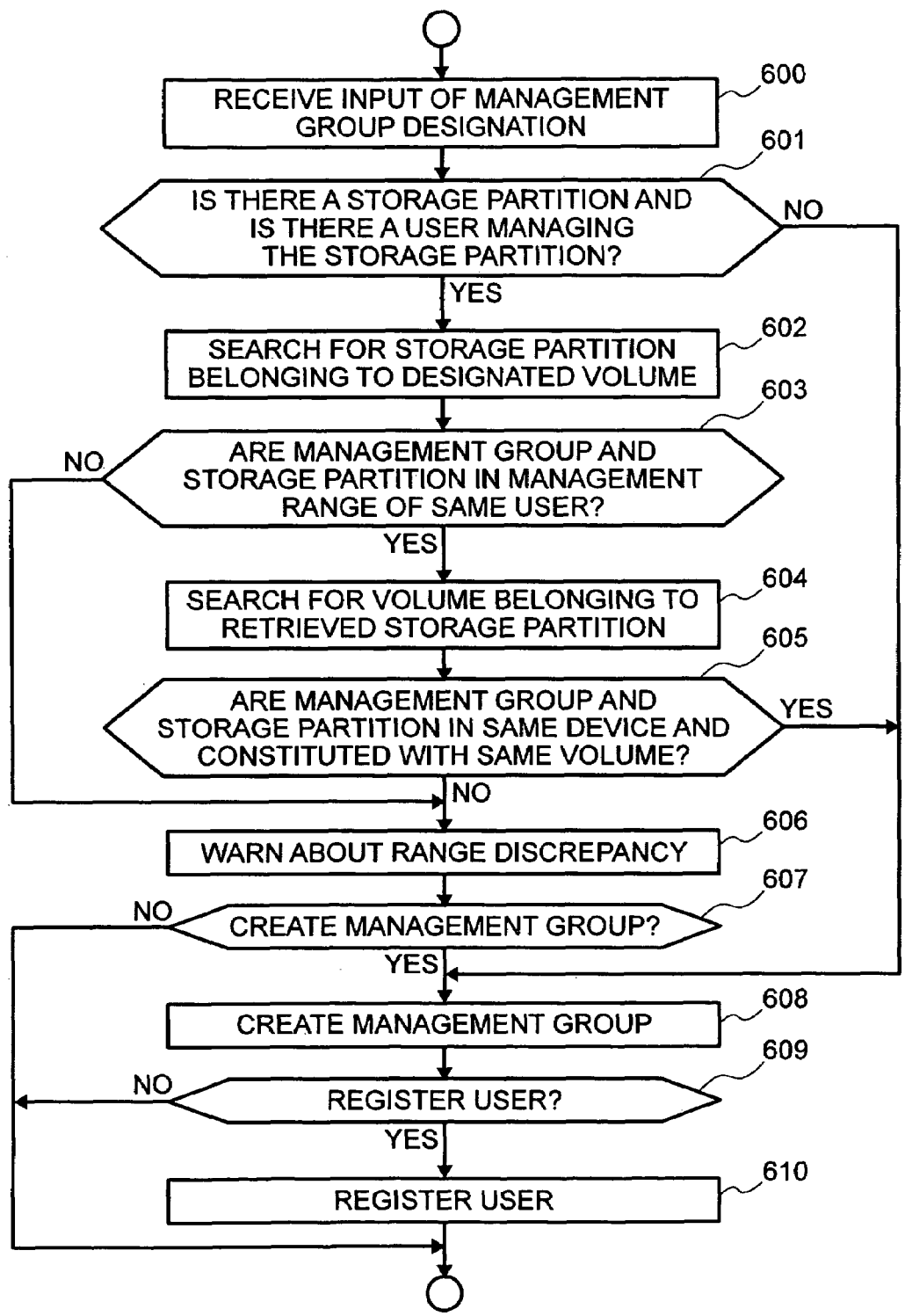
FIG. 6 is a flowchart of the process for detecting a volume management range mismatch, according to a second embodiment.

FIG. 6 is a flowchart, according to the second embodiment of the present invention, showing an exemplary sequence of processing for detecting the mismatch between the volume management range on management computer 100, and the volume management range of the storage partition in storage 120. The processing shown in the flowchart is included in management group program 110. The difference from the processing sequence shown in FIG. 5 is that FIG. 6 shows a sequence of processing to detect the mismatch between the management ranges, when the management group is created under conditions where the storage partition has already been set.

Management group program 110 receives the input of the management designation (step 600). Here, it is assumed that the volume ID is designated to create the volume group.

Next, the storage partition information is managed on management computer 100, and the processing determines whether or not the storage partition is being managed by the user (step 601). At step 601, management group program 110 references storage partition table 240 and user storage partition table 330, and the processing determines whether or not there is a storage partition and the storage partition is being managed by the user. Here, the processing may also check whether or not the information in user table 250 and user storage partition table 330 match. If a mismatch has occurred, then a warning to that effect may be emitted and the processing may end. If there is a storage partition and this storage partition is being managed by the user, the processing advances to step 602; if not, the processing advances to step 608.

Next, management group program 110 obtains the storage partition group where the volume designated at step 600 belongs, from volume table 210 and storage partition table 240 (step 602). Management group program 110 communicates with storage structuring program 124 of storage 120 via I/F 103 and I/F 122, and obtains the information from volume table 210 and storage partition table 240, which are in storage configuration information 125. For example, when structuring a management group to manage volumes with IDs "6" and "7" in storage ID "1", from volume table 210, it is understood that "3" and "4" are the respective storage volume groups where the volumes with IDs "6" and "7" belong. It is also known that storage volume group "3" belongs to storage partition group "2" and storage volume group "4" belongs to storage partition group "1".

Next, management group program 110, based on the storage partition group information obtained at step 602, investigates whether the same user can manage the management group and the storage partition group (step 603). That is, it investigates whether the users of the management groups are the same in each of the designated storage partition groups. In the storage partition group, if the management groups have different users, then it is judged that there are no users managing the volumes belonging to the storage partition group. This situation indicates that a mismatch has occurred between the management range in the storage partition and the management range in the management group. If the same user can manage the storage partition, this constitutes an instance where the management ranges match each other, and processing advances to step 604. If management cannot be performed by the same user, then the management groups are judged to be a mismatch, and processing advances to step 606.

For example, according to step 602, the obtained storage partition group IDs were "1" and "2". Therefore, in user storage partition table 330, if the users managing the storage partition IDs are set differently for the storage partition IDs "1" and "2", then the management ranges are a mismatch and processing advances to step 606. If the users indicated with respect to storage partitions "1" "2" are the same, then processing advances to step 604.

Next, management group program 110 obtains the volumes belonging to the storage partition group obtained at step 602 from volume table 210 and storage partition table 240 (step 604). Management group program 110 communicates with storage structuring program 124, and obtains the information from these tables. For example, according to the example at step 602, since the IDs of the obtained storage partitions are "1" and "2", the storage volume groups belonging to these storage partition group IDs are "3", "4" and "5" from storage partition table 240. Thus, it is understood that the volumes which need to be obtained are those belonging to storage volume groups "3", "4" and "5", and volumes "5", "6", "7" and "8" in storage ID 1 from the volume table 210.

Next, management group program 110, based on the volume information specified at step 600 and the volume information obtained at step 604, investigates whether volumes belonging to the management group and the volumes belonging to the storage partition are in the same storage and are structured with the same volumes (step 605). If their configurations are the same, then the management ranges match, and processing advances to step 608. If they are different, then the management ranges do not match, processing advances to step 606. For example, as shown in the example in step 602, the volumes designated at step 600 have IDs "6" and "7", and from step 604 the volumes managed in the storage partitions "1" and "2" have IDs "5", "6", "7" and "8". Therefore, the management ranges do not match each other, and the processing advances to step 606.

At step 606, management group program 110 judges, based on the results obtained from the steps up to step 605, that there is a possibility that the management ranges of the designated management group and the existing storage partition do not match, and a warning is emitted. This notifies the user that the management ranges do not match for the designated management. However, in the example introduced thus far, by creating another management group and structuring it to manage the volumes with IDs "5" and "8", the management ranges can be matched with each other. This alternative volume configuration can be presented to the user.

At step 607, using the display device of the management computer 100, the user is queried whether to create the management group. This query reconfirms whether to create the management group even in an environment where creating performing management group by the processing up to step 606 will produce different management ranges in the storage partition. If the user instructs that such management group, be created processing advances to step 608; if not, processing ends.

At step 608, management group program 110 actually creates the management group. That is, in volume management group table 300, the new management group ID 301 and the designated storage ID and volume ID, are registered as a storage ID 302 and a volume ID 303, respectively.

At step 609, management group program 110 has the user select whether or not to perform user registration with respect to this management group. If the user instructs to perform registration for the designated management group, then the processing advances to step 610; if not, then the processing ends.

At step 610, the management group program 110 registers the user managing this management group in user management group table 320. The processing ends upon completion of this registration.

According to the above-mentioned processing sequence, the processing can determine that the management ranges of the storage partition group and the management group involve ranges that are different from each other, and from this determination, the user can select the processing, whereby the proper matching of the management ranges can be provided to the user.

Furthermore, when the management group is created in conditions where the storage partition has already been set, there are cases where the user references the information in the storage partition group while creating the management group. In this situation, when a processing sequence such as shown in FIG. 6 is executed, many confirmations are sought from the user, and it is possible that information the user already knows will be displayed again. Therefore, it is possible to provide processing which lets the user judge in the beginning whether to execute each step shown in FIG. 6.

In the third embodiment of the present invention, when creating the storage partition group, and when creating the management group, if it is detected that the management ranges of the storage partition group and the management group are different, then, by modifying the configuration of the storage partition group or by modifying the configuration of the management group, the management ranges of the storage partition and management groups can be matched.

Figure 7:
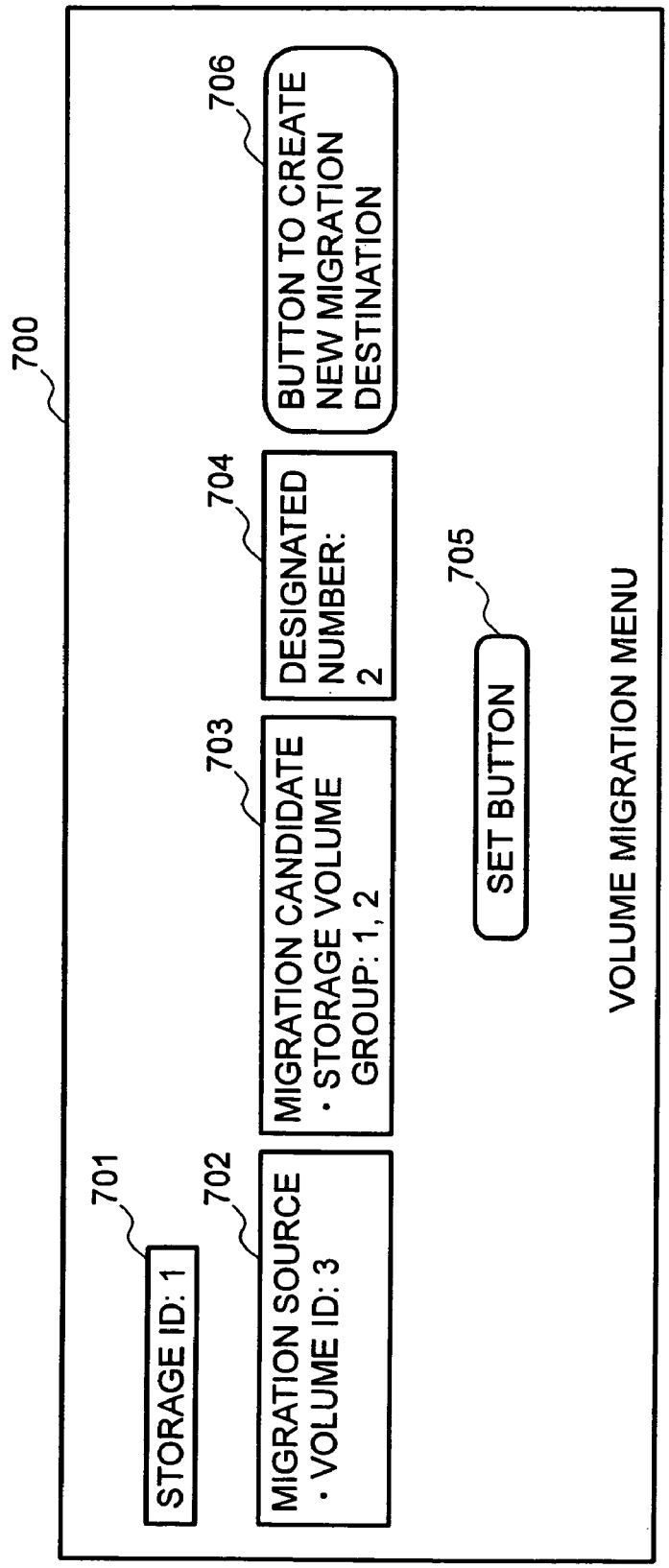
FIG. 7 is a diagram showing an example of a volume migration menu screen according to an embodiment.

FIG. 7 shows a screen for enabling proper matching of the storage partition, which shows the volumes with the mismatched management ranges, and where a migration destination can be selected to make the management ranges match. The migration destination for the volume which is the migration source can be either the storage volume group or the management group.

A volume migration menu screen 700 is a guidance screen for assisting the volume migration. The screen has an area 701 that displays the storage ID, an area 702 that displays the migration source volume where the management range was a mismatch, and a migration candidate area 703 that displays a migration destination for the volume. The user, using the content in the areas 701, 702, 703, designates information being given as the migration candidate. Then the user designates the volume migration destination in a designation number area 704. Next, by pressing a set button 705, the designated information is sent to management computer 100. Furthermore, in order to set anther migration destination (storage volume group or management group) instead of using the migration candidate in area 703, a new migration destination creation button 706 is provided. This button is pressed to move to a screen for creating a new migration destination instead of the migration destination in area 703. After the new destination is created, the result is displayed in designation number 704. By pressing set button 705, the processing from the volume migration is performed. Furthermore, a cancel button may also be provided in volume migration menu screen 700, to provide the option to cancel and not execute the designation.

Figure 8:
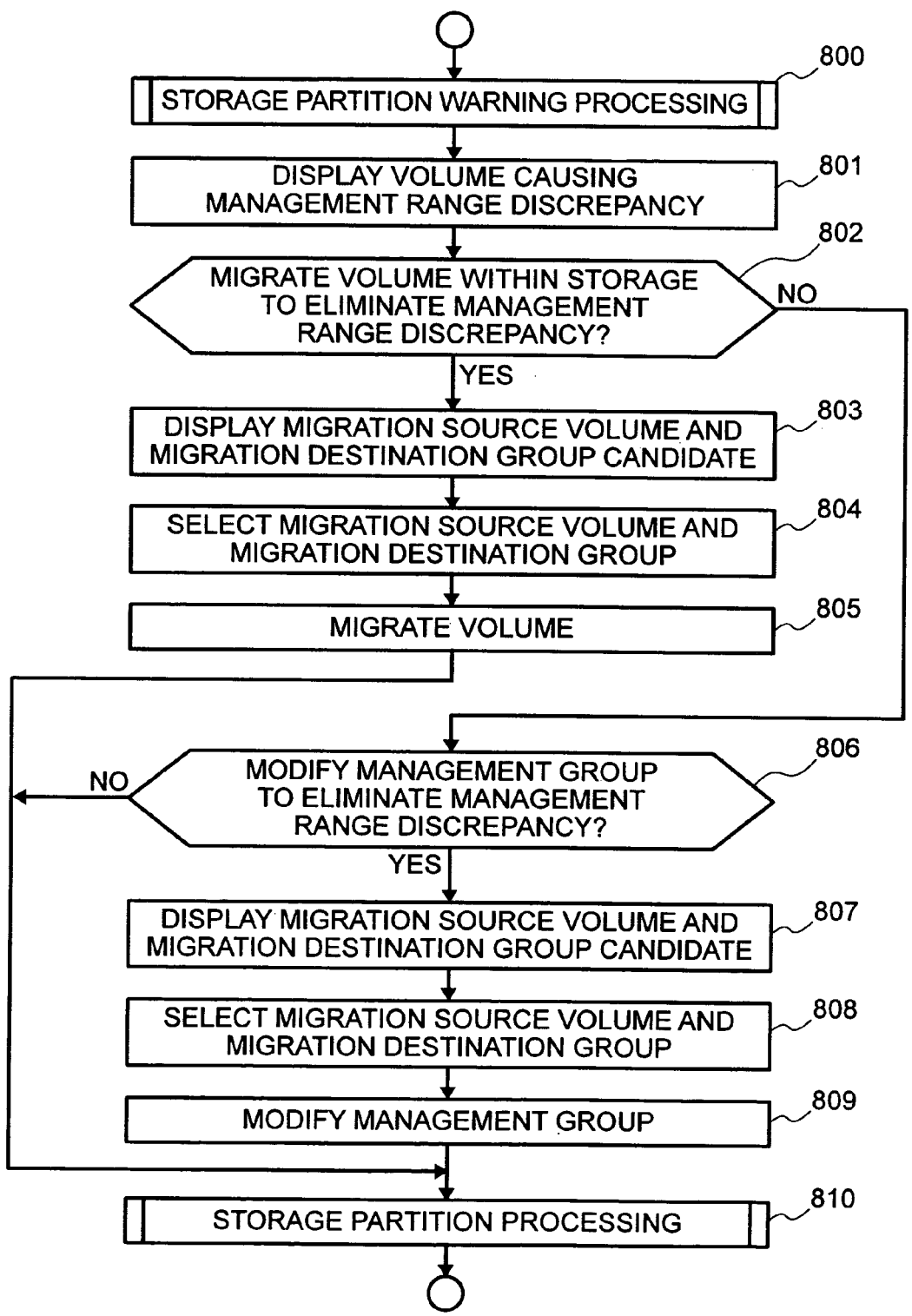
FIG. 8 is an exemplary flowchart of a sequence of the process for eliminating a volume management range discrepancy according to a third embodiment.

FIG. 8 is a flowchart, according to the third embodiment of the present invention, showing an exemplary sequence of processing for eliminating the discrepancy between the management ranges, in a case where the management ranges of the storage partition group and management group are different from each other. The processing shown in this flowchart is included in management group program 110, storage partition management program 111 and volume allocation program 112. Management group program 110 and storage partition management program 111 perform processing to detect the volume management range discrepancy (step 800). This is the processing from step 500 to step 507 in the flowchart of FIG. 5.

Next, management group program 110 displays the volumes that are the source of the management range discrepancy (step 801). That is, management group program 110 displays the respective volumes of the storage volume group and the management group which have the different management ranges. According to the above-mentioned example, when creating the storage partition group which consisted of the storage volume groups "1" and "2", the volumes belonging to storage volume groups "1" and "2" and the volumes belonging to management groups "1" and "2" are displayed at this time. This indicates that there are different management ranges between management groups "1" and "2" because a user of management group ID "1" is different from that of management group ID "2".

Next, the user selects whether to perform the volume migration to eliminate the discrepancy between the management ranges. If the user selects not to migrate the volume within storage, processing advances to step 806; if the user selects to migrate the volume, processing advances to step 803 (step 802).

At step 803, management group program 110 displays the volume which will be moved and the possible storage volume groups which could serve as the migration designation. This is the volume where the mismatch has occurred and should be migrated. For the storage volume group that could possibly be the migration destination, a storage volume group where the management groups do not overlap is shown. Management group program 110 displays area 701 in volume migration menu screen 700, and the volume ID of the volume that will be migrated to area 702 is displayed. Furthermore, area 703 displays the storage volume groups that are the possible migration destinations.

For example, when creating the storage partition group made of storage volume groups "1" and "2", the users of management groups "1" and "2" are different, and this creates a discrepancy between the management ranges. At this time, with respect to volume "3" with storage ID "1", the storage volume group and the management group are registered differently. Thus it is understood that volume which should be migrated is only the one volume "3". Therefore, the volume with volume ID "3" becomes a candidate.

Furthermore, the candidate for the storage volume group for the migration destination is a storage volume group where the management groups do not overlap and where the storage volume group is "2" or one which is not managed by the user. If this candidate storage volume group is a parity group, then the RAID structure thus constituted may be displayed.

For the migration destination volume, it is also possible to display a pattern where two volumes may be migrated to make the management ranges match, so as to broaden the user's option. At step 804, the user selects the migration destination displayed at step 803. The user inputs a value into the designation number area 704. The management group program 110 receives this selection.

At step 805, the volume allocation program 112 gives an instruction to the storage structuring program 125 of the storage 120 for the volume selected at step 804, and the storage structuring program 125 re-allocates the volume. Then, after this processing is successfully completed, the volume allocation program 112 receives a notification of the success, and updates the information in the volume management group table 300 of the storage management information 113. After that, the processing advances to the storage partitioning processing at step 810. This processing is processing from step 508 to step 511 in the flowchart in FIG. 5. The step 805 begins processing when the set button 705 on the volume migration menu screen 700 is pressed.

At step 806, the user selects whether or not to migrate the volume between the management groups to eliminate the discrepancy between the users. If the user selects to not migrate the volume in the storage, then the processing advances to step 810; the user selects to migrate, then the processing advances to step 807.

At step 807, the management group program 110 displays the IDs of the management groups that can possible serve as the migration destination of the volumes which should be migrated. In this display, the volume where the discrepancy occurred is the migration destination volume, and the management group that can be the migration destination is the management group where the storage volume groups do not overlap. In the storage migration menu screen 700, the area 701 displays the storage ID 201, and the 702 displays the volume ID that the volume should be migrated to. Furthermore, the area 703 displays the management group that is the possible migration destination.

For example, when creating the storage partition group made of the storage volume groups "1" and "2", the discrepancy between the users of the management groups "1" and "2" causes the discrepancy between the management ranges. At this time, it is understood that the storage volume group and the management group are registered differently, and volume to be migrated can be only one of either volume "3" or "4". Therefore, the volumes with the volume IDs of "3" and "4" become the candidates this time.

The candidates for the migration destination storage volume group are the storage volume groups where the management groups do not overlap. For the volume ID "3", the management group is "2" or the storage volume groups not managed by the user. For the volume ID "4", the management group "1" or the storage volume groups that are not managed by the user is displayed.

The volumes that are the migration destinations may also be displayed in a pattern where the migration is performed in two steps, so as to broaden the users' options. At the step 808, the user selects the migration destination displayed at step 807. The user inputs a value into the designation number area 704. The management group program 110 receives this selection.

At step 809, the management group program 110 migrates the volume that is the migration source selected at step 808, to the management group that is the migration destination, and registers this into the volume management group table 300. Thereafter, the procedure proceeds to storage partition processing (step 810). The processing at step 809 is started when set button 705 in the volume migration menu screen 700 is pressed. According to the foregoing processing sequence, the volume migration candidate, and the migration destination storage volume group or management group are given, and the settings can be made, so as to match the management range in the management computer 100 and the management range in the storage 120 to each other.

Furthermore, the management computer 100, when the management group is designated, judges whether or not the management group as the same management range as the storage partition. If the management ranges are different, then processing similar to the processing in FIG. 8 is performed so as to make the management range in the management computer 100 and the management range in the storage 120 match each other.

At step 803, when the new migration destination creation button 706 is pressed, the processing to create the storage volume group may be used, to perform processing to create a new storage volume group. At step 807, when the new migration destination creation button 706 is pressed, the processing to create the new management group may be used, to perform processing to create a new management group.

Furthermore, the sequence of the processing from step 802 to step 805, and the processing at step 806 to step 809, may be performed in reverse order. In such this case, the procedures must be modified such so when a "No" is produced at step 806 the processing advances to step 802, and when a "No" is produced at step 802 the processing advances to step 810.

The fourth embodiment of the present invention is processing in which, when the port and the cache partition that are elements of the storage partition, are managed on the management computer 100 as managed object of the management group, a warning is issued when a mismatch occurs between the management ranges similarly to the volumes.

FIG. 9 is a diagram showing, according to the fourth embodiment, an example configuration of an additional table for the storage management information 113 used by each of the programs executed on the management computer 100. The storage management information 113, in addition to the tables shown in FIG. 3, also has a port management group table 900 and a cache partition management group table 910.

The port management group table 900 stores the management group ID 301, the storage ID 201, and the port ID 231 showing the identifier of the I/F (B) 141. The cache partition management group table 910 stores the management group ID 301, the storage ID 201, and the cache partition ID 221 which is the identifier of the cache partition managed inside the storage.

Furthermore, in the storage 120, if it is possible to partition the management of the processor 121 and the memory 123, then this information may be placed under the management of the management group. Such partitionable resources in the storage 120 may be defined as devices.

Figure 10:
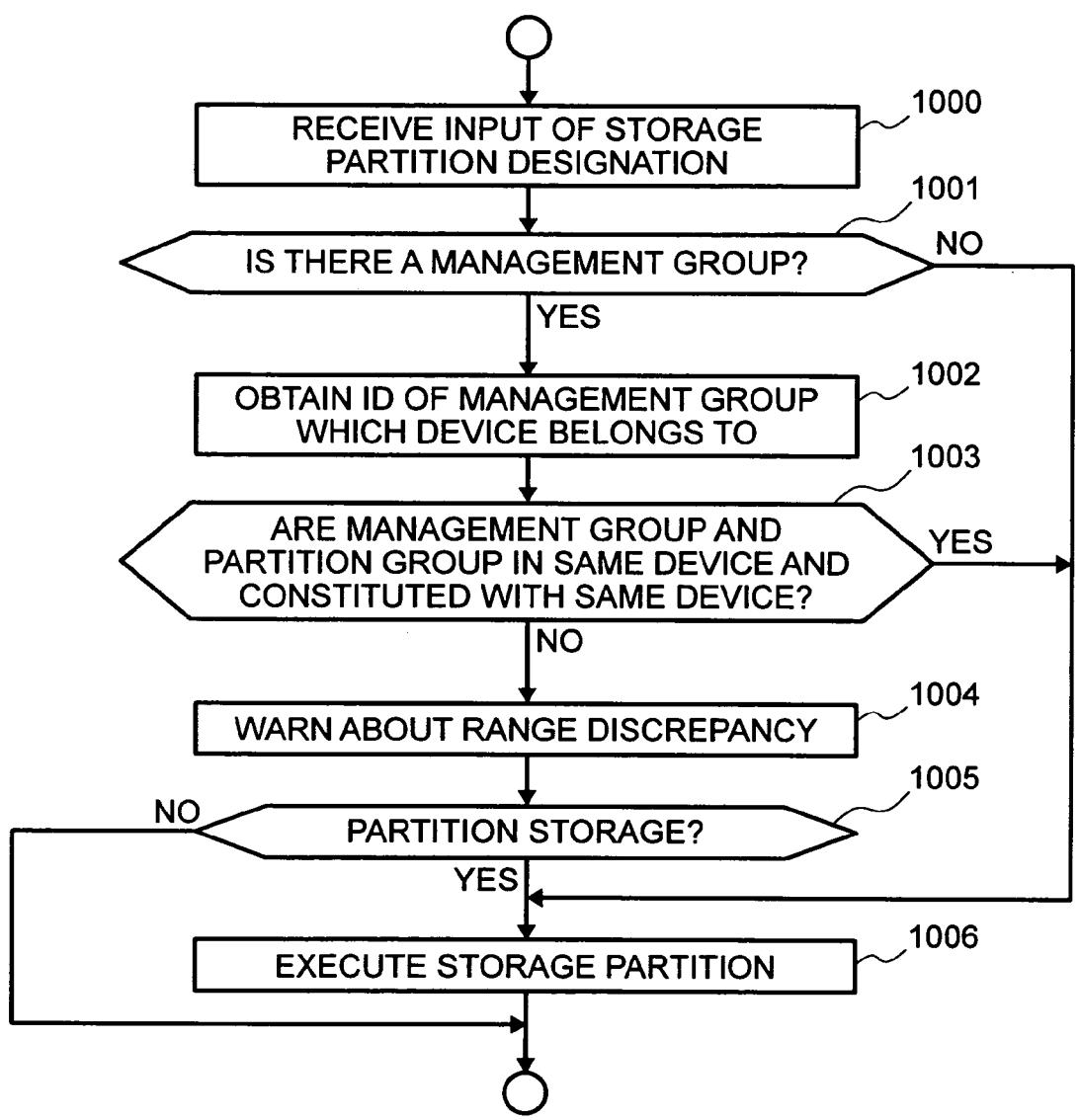
FIG. 10 is a flowchart showing an exemplary sequence of the process for detecting a device management range mismatch according to the fourth embodiment.

FIG. 10 is an example of a flowchart showing a sequence of processing, according to the fourth embodiment of the invention, to detect the mismatch between the volume management range on the management computer 100, and the device management range produced by the port or cache partitioning and the like produced by the storage partition inside the storage 120. The processing shown in this flowchart is included in the management group program 110 and the storage partition management program 111. The example of the processing shown in FIG. 10 shows the sequence of processing performed when the management group information has already been set in advance, to detect a mismatch between the management ranges.

The storage partition management program 111 executes the processing at step 1000 and step 1006, and the management group program 110 executes the processing at the other steps. The storage partition management program 111 receives the input of the storage partition designation (step 1000). At this time, the partition unit area 402 in the storage partition settings menu screen 400 designates the port and (or) the cache partition, and the partition target area 403 designates the port ID and(or) the cache partition ID.

Next, the management group program 110 determines whether the management group is present on the management computer, or the management group is being managed by any of the users (step 1001). At step 1001, if values are present in the management group ID 301 in the host management group table 310 and the management group ID 301 in the user management group table 320, it is judged that the management group does exist. Whether this management group is being managed by a user is determined by whether or not there are values in the management group ID 301 and the user ID 251 in the user management group table 320. If the management group does exist, or if the management group is being managed by a user, then the process advances to step 1002; if not, then the process advances to step 1006.

Next, the management group program 110 obtains the management group ID from the designated device value (step 1002). For example, the port ID "1" and the cache partition ID "1" of the storage ID "1" are designated, then "1" is the ID of the management group that these devices belonging to. Here, if a mismatch occurs between the respective devices for the management group ID, then a warning is emitted.

Next, the management group program 110, based on the device information obtained at step 1002 and the information from the storage partition table 240, investigates whether the device belonging to the management group and the device belonging to the storage partition are in the same storage, and whether they are configured with the same device (step 1003). If they are configured with the same device, then the management ranges are the same and the process advances to step 1006. If they are different, then the management ranges are not the same, and the process advances to step 1004. For example, when creating a new storage partition where the same managed object involves the ports "3" and "4", then, according to the examples of the user management group table 320 and the port management group table 900, the ports with the IDs of "3" and "4" will be the member items in the management groups "1" and "2". However, since the users managing the management groups "1" and "2" are different, the management ranges do not match each other. Therefore, in this case, the processing advances to step 1004.

At step 1004, the management group program 110, from the steps through step 1003, judges that the management ranges of the designated storage partition and the existing management group do not match each other, and thus displays a warning. Accordingly, it is possible to display to the user that in the designated storage partition the management ranges cannot be matched to each other.

At step 1005, via the management computer's display device, the user is queried as to whether to partition the storage. This query reconfirms whether to perform the storage partition to modify the storage configuration even in the environment where the management range of the management group will be changed by the processing up to step 1004. If the user instructs to perform the storage partition, then the processing advances to step 1006; if not, then the processing ends.

At step 1006, the storage partition management program 111 performs the actual storage portioning processing. The processing at this step passes a request from the storage partition management program 11 through the I/F 103 to the storage structuring program 124 of the storage 120, and performs the actual storage partition processing. The foregoing processing sequence determines whether or not the management ranges of the storage partition and the management group different from each other with respect to each device, and by this determination allows the user to select the processing, whereby the proper matching of the management ranges can be informed to the user.

Figure 11:
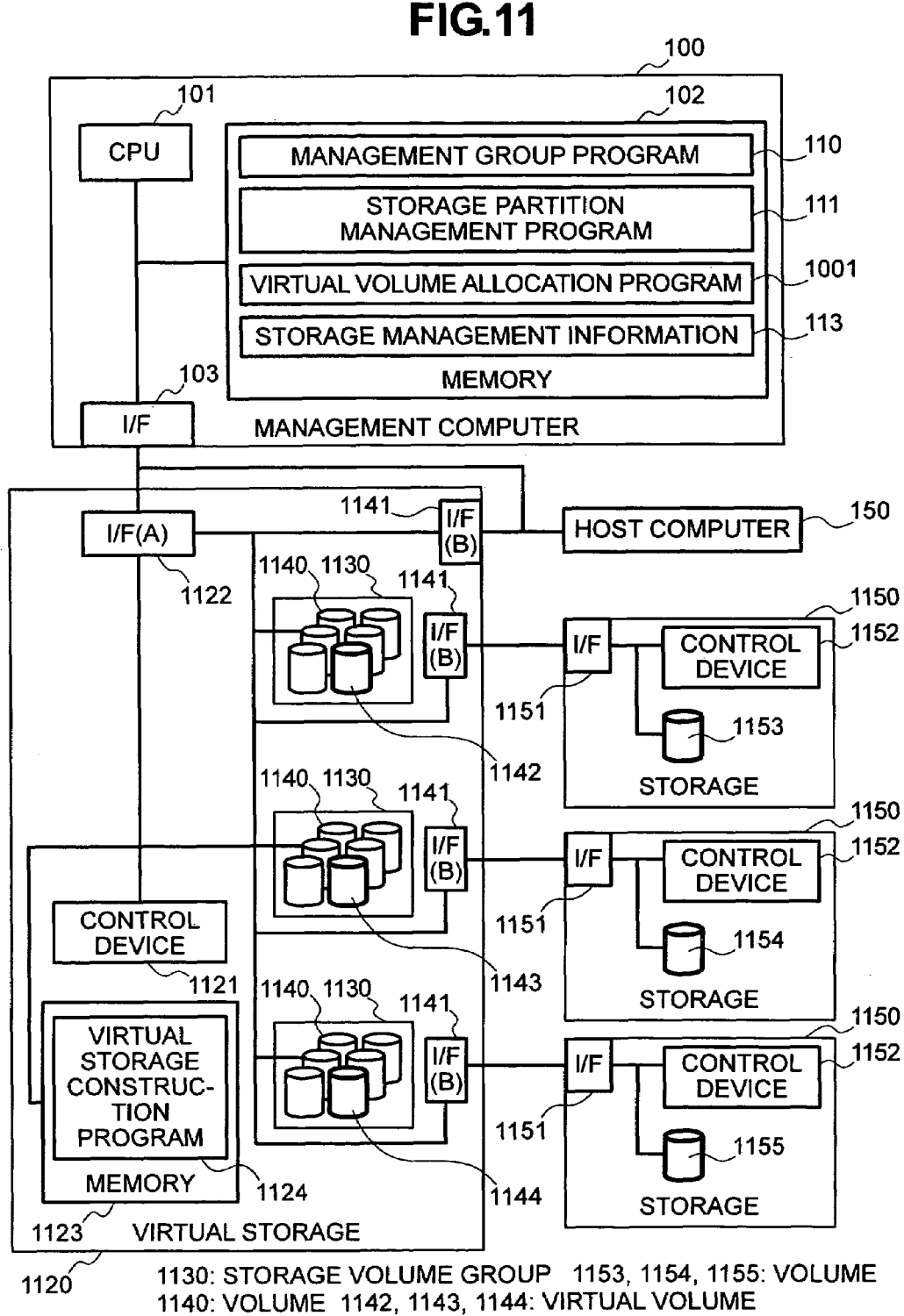
FIG. 11 is a chart showing an exemplary configuration of a storage device configuration management system according to a fifth embodiment.

FIG. 11 is an example of a diagram showing a configuration of a storage device configuration management system according to a fifth embodiment of the present invention. A virtual storage 1120 is a device that virtualizes storage. The virtual storage 1120 is constituted by a volume 1140 that is a management area storing data actually managed by the management computer; virtual volumes 1142, 1143, 1144 that virtualize volumes in other storages and are visible from the host computer as the volumes of the virtual storage 1120; an I/F (B) 1141 for sending and receiving data I/O for performing communications between the virtual volumes 1142, 1143, 1144, the host computer 150, the actual volumes and the like; an I/F (A) 1122 for performing communications with the management computer 100 and the like; a control device 1121 for performing control on the actual storage; and a memory 1123. The I/F (B) 1141 and the I/F (A) 1122, depending on the communications format (e.g., IP (Internet Protocol) connection) may be arranged as a single communications device.

A storage volume group 1130 may be either just the virtual volume 1142, 1143 or 1144, or a unit that groups the volume 1140 with the virtual volume 1142, 1143 or 1144. This forms a single unit of storage area managed in the virtual storage 1120. For example, in the case of storage capable of creating a RAID structure, it is possible to handle the aggregate of disks that can constitute the RAID as a single storage volume group, and then create the RAID volumes inside the storage volume group 1130, thus creating this environment. This type of storage volume group 1130, the storage volume group 1130 is sometimes called a parity group, a RAID group, or the like. Furthermore, this environment can also be created with the virtual volumes 1142, 1143, 1144 arranged as if they belong to the storage volume group 1130.

A virtual storage structuring program 1124 in the memory 1123 is executed by the processor in the control device 1121 to realize the functions thereof. The virtual storage structuring program 1124 is a program for managing the allocation of the storage volume groups and the volumes of the virtual storage 1120, and is a program for creating the partitioned storage within the virtual storage. The storage configuration information is configuration information about these volumes and storage volume groups.

The management computer 100 is provided with a virtual volume allocation program 1001 that was not in the management computer 100 of FIG. 1. The virtual volume allocation program 1101 : is stored in the memory 102 of the management computer 100, and is executed by the CPU 101 to realize the functions thereof.

The storage 1150 (storage system) has: an I/F (B) 1151 that sends and receives data I/O with the virtual volumes 1142, 1143, 1144 of the virtual storage 1120; a control device 1121; audvolumes 1153, 1154, 1155. The control device 1121 is constitutedwith the processor 121, the memory 123 and the like.

The virtual volume is a virtualization of the actual volume, and does not have to actually exist in form. According to the example in FIG. 11, the virtual volume 1142 constituted by the volume 1153, the virtual volume 1143 constituted by the volume 1154, and the volume 1144 constituted by the volume 1155, are provided to the host computer. As such, actual volume area of the virtual volume 1142 of the virtual storage 1120, for example, will be another volume 1153 of the storage 1150.

According to this example, the virtual volume 1142 and the virtual volume 1143 belong separate storages, and therefore will belong to separate storage partition groups. When a designation is made so that the virtual volume 1142 and the virtual volume 1143 belong in the same storage volume group, a management range mismatch will occur. In this case, the processing shown in the flowcharts in FIG. 5 and FIG. 8 will emit the warning against about the mismatch. Furthermore, in the case where the selection is made to migrate the volume, it is necessary to provide the volume migration method with a processing to re-create the configuration of the virtual volume that belongs in the storage volume group, such that the virtual volume can undergo storage partitioning, instead of manipulations within the storage. Therefore, the migration of the volume is not a migration of the volume within the virtual volume, but rather a migration of the volume from the virtual volume to another virtual volume. Other processing sequences are similar to the processing sequenes in the above-mentioned embodiments. Accordingly, the same effect can be obtained as in the processing for migrating volumes within the same storage.

Figure 12:
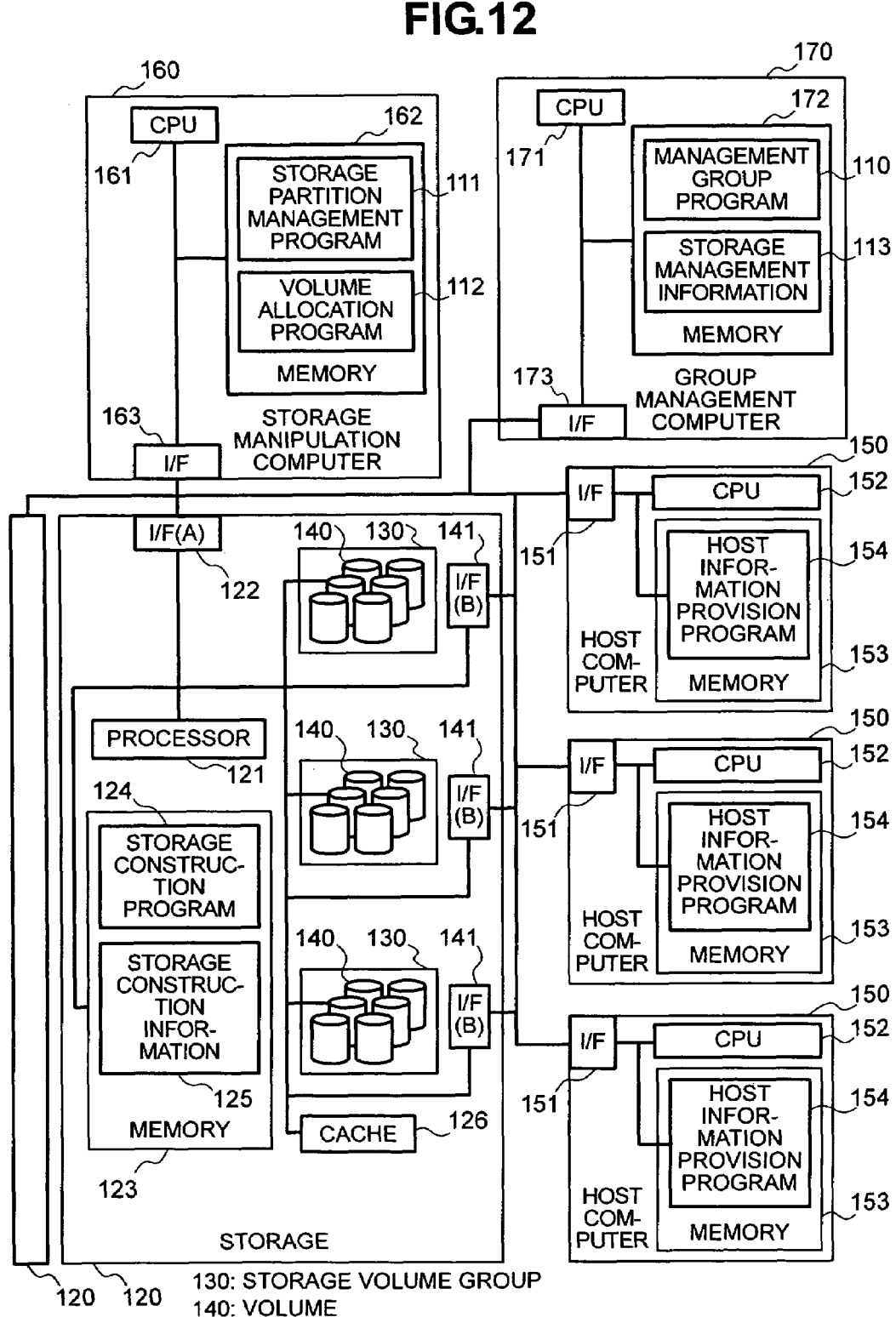
FIG. 12 is a diagram showing another exemplary configuration of a storage device configuration management system according to an embodiment.

FIG. 12 is an example of a diagram showing a configuration of a storage device configuration management system according to an embodiment of the present invention. The configuration is different from FIG. 1. A storage manipulation computer 160 is provided with an I/F 163 for communicating between the CPU 161 and memory 162, and the storage 120, host computer 150 and a group management computer 170. The group management computer 170 is further provided with a CPU 171, a memory 172, the storage manipulation computer 160, and an I/F 173 for communicating with the storage 120. The management group program 110, the storage partition management program 111 and the volume allocation program 112 realize the processing of the embodiment of the present invention. The management group program 110 is stored in the memory 172 of the group management computer 170, and is realized by being executed by the CPU 171. The storage partition management program 111 and the volume allocation program 112 are stored in the memory 162 of the storage manipulation computer 160, and are realized by being executed by the CPU 161. The storage management information 113 is information that is used by the management group program 110, the storage partition management program 111 and the volume allocation program 112.

In contrast to the configuration in FIG. 1, in the processing in the first through fourth embodiments, the management group program 110, and the storage partition management program 111 and the volume allocation program 112, operate on different computers. Therefore, communications are performed not only the storage 120 currently undergoing processing, but also between the storage manipulation computer 160 and the group management computer 170, to call up programs that operate with respect to each other. Each of the programs obtains information stored in the storage 120 when necessary via the network, and executes program processing.

In FIG. 1, the manipulation of the information settings for the storage 120, and the management of the management group, were performed on the same management computer 100. However, according to the configuration in FIG. 12, the computer that manipulates the storage and the computer that manages the storage information per user are split, whereby the roles of the computers in performing the storage management can be clarified.

Note that there may be one group management computer 170 for each user managing a group, and may be constructed so as to communicate between the storage manipulation computer 160 and the storage 120 via each network. In accordance with the present invention, for the volumes held in the storage, discrepancies are detected between the management range of the user on the management computer and the management range of the user inside the storage, thus clarifying the management range of the users.

What is claimed is:

1. A storage system configuration management method executed by a management computer, for detecting a mismatch between management ranges of a first storage area set inside a storage system, and a second storage area in a management range of a user set inside the management computer, a plurality of host computers connected to the storage system, the first storage area being constituted by RAID structure units each formed by an aggregate of a plurality of storage area units, and the second storage area in the management range of the user being managed by logical volume units including a plurality of the storage area units, the method comprising:

when identifiers of a plurality of the storage area units are designated as managed objects, obtaining an identifier of at least one of the RAID structure units to which the designated plurality of storage area units belong;

referencing an identifier of a user whose management range is at least one of the RAID structure units, and determining whether or not the RAID structure unit obtained at the obtaining step is in the management range of the same user; and when the obtained RAID structure unit is partitioned into management ranges of a plurality of users, outputting the determination result;

wherein the management range of a host computer does not correspond to the management range of the user using the host computer.

2. A storage system configuration management method executed by a management computer, for detecting a mismatch between management ranges of a first storage area set inside a storage system, and a second storage area in a management range of a user set inside the management computer, a plurality of host computers connected to the storage system, the first storage area being constituted by RAID structure units each formed by an aggregate of a plurality of storage area units, and the second storage area in the management range of the user being managed by logical volume units including a plurality of the storage area units, the method comprising:

when an identifier of at least one of the RAID structure units is designated as a managed object, obtaining identifiers of a plurality of the storage area units belonging to the designated RAID structure unit;

referencing a first table storing an identifier of a user whose management range is at least one of the storage area units, and determining whether or not the plurality of the storage area units obtained at the obtaining step are in the management range of the same user; and when the obtained plurality of storage area units are partitioned into the management ranges of a plurality of users, outputting the determination result;

wherein the management range of a host computer does not correspond to the management range of the user using the host computer.

3. The storage system configuration management method according to claim 1, further comprising:

when the management range is partitioned for a plurality of users, displaying the identifier of the storage area unit that is a migration source candidate when migration is conducted to modify the management range of the user; and removing the storage area unit that is selected as the migration source from the RAID structure unit, so as to modify the management range of the user so that the remaining RAID structure unit constitutes a management range of the same user.

4. The storage system configuration management method according to claim 2, further comprising:

when the management range is partitioned for a plurality of users, displaying the identifier of the storage area unit that is a migration source candidate when migration is conducted to modify the management range of the user; and removing the storage area unit that is selected as the migration source from the RAID structure unit, so as to modify the management range of the user so that the remaining RAID structure unit constitutes a management range of the same user.

5. The storage system configuration management method, according to claim 1, further comprising:

referencing a table storing a correspondence between an identifier of a system provided inside the storage system and an identifier of a user, and determining whether or not a user corresponding to a designated system is registered in the table;

when it is determined that the user is registered in the table, obtaining the identifier of the user that is set in the storage system for the designated system;

determining whether or not the identifier of the user registered in the table and corresponding to the designated system and the identifier of the user thus obtained match each other; and when the identifiers of the users do not match each other with respect to the system, outputting the determination result.

6. The storage system configuration management method, according to claim 2, further comprising:

referencing a second table storing a correspondence between an identifier of a system provided inside the storage system and an identifier of a user, and determining whether or not a user corresponding to a designated system is registered in the second table;

when it is determined that the user is registered in the second table, obtaining the identifier of the user that is set in the storage system for the designated system;

determining whether or not the identifier of the user registered in the second table and corresponding to the designated system and the identifier of the user thus obtained match each other; and when the identifiers of the users do not match each other with respect to the system, outputting the determination result.

7. The storage system configuration management method according to claim 1, wherein the system is one of a port operating as a communications interface to a host computer that accesses the first storage area in the storage system, and a cache partition relating to a cache that is a temporary storage system of the storage system.

8. The storage system configuration management method according to claim 2, wherein the system is one of a port operating as a communications interface to a host computer that accesses the first storage area in the storage system, and a cache partition relating to a cache that is a temporary storage system of the storage system.

9. A computer-readable storage medium storing a program for causing a management computer to realize a function of detecting a mismatch between management ranges of a first storage area set inside a storage system, and a second storage area in a management range of a user set inside the management computer, a plurality of host computers connected to the storage system, the first storage area being constituted by RAID structure units each formed by an aggregate of a plurality of storage area units, and the second storage area in the management range of the user being managed by logical volume units including a plurality of the storage area units, the program comprising:

code that, when identifiers of a plurality of the storage area units are designated to the management computer as managed objects, obtains an identifier of at least one of the RAID structure units to which the designated plurality of storage area units belong;

code that references a table storing an identifier of a user whose management range is at least one of the RAID structure units, and determines whether or not the RAID structure unit obtained by the code that obtains is in the management range of the same user; and code that, when the obtained RAID structure unit is partitioned into the management ranges of a plurality of users, outputs the determination result;

wherein the management range of a host computer does not correspond to the management range of the user using the host computer.

10. A computer-readable storage medium storing a program for causing a management computer to realize a function of detecting a mismatch between management ranges of a first storage area set inside a storage system, and a second storage area in a management range of a user set inside the management computer, a plurality of host computers connected to the storage system, the first storage area being constituted by RAID structure units each formed by an aggregate of a plurality of storage area units, and the second storage area in the management range of the user being managed by logical volume units including a plurality of the storage area units, the program comprising:

code that, when an identifier of at least one of the RAID structure units is designated to the management computer as a managed object, obtains identifiers of a plurality of the storage area units to which the designated RAID structure units belong;

code that references a table storing an identifier of a user whose management range is at least one of the storage area units, and determines whether or not the plurality of the storage area units obtained by the code that obtains are in the management range of the same user; and code that, when the obtained plurality of storage area units are partitioned into the management ranges of a plurality of users, outputs the determination result;

wherein the management range of a host computer does not correspond to the management range of the user using the host computer.

11. A storage system configuration management system, comprising: a storage system holding a plurality of volumes, a management computer connected to the storage system, and a plurality of host computers connected to the storage system, a first storage area being constituted by RAID structure units each formed by an aggregate of a plurality of the volumes, and a second storage area in the management range of the user set in the management computer being managed by logical volume units including a plurality of the volumes, wherein the management computer has a CPU and a memory, and holds in the memory a storage system management information table storing an identifier of a user whose management range is the RAID structure unit; and wherein the CPU, when identifiers of a plurality of the volumes are designated as managed objects, obtains an identifier of at least one of the RAID structure units to which the designated plurality of volumes belong; references the storage system management information table, and determines whether or not the RAID structure unit obtained is in the management range of the same user; and, when the obtained RAID structure unit is partitioned into the management ranges of a plurality of users, outputs the determination result;

wherein the management range of a host computer does not correspond to the management range of the user using the host computer.

12. A storage system configuration management system, comprising:

a storage system holding a plurality of volumes, a management computer connected to the storage system, and a plurality of host computers connected to the storage system, a first storage area being constituted by RAID structure units each formed by an aggregate of a plurality of the volumes, and a second storage area in the management range of the user set in the management computer being managed by logical volume units including a plurality of the volumes, wherein the management computer has a CPU and a memory, and holds in the memory a storage system management information table storing an identifier of a user whose management range is at least one of the volumes, and wherein the CPU, when identifiers of at least one of the RAID structure units are designated as managed objects, obtains identifiers of the plurality of volumes to which the designated RAID structure units belong; references the storage system management information table, and determines whether or not the obtained plurality of volumes are in the management range of the same user; and when the obtained plurality of volumes are partitioned into the management ranges of a plurality of users, outputs the determination result;

wherein the management range of a host computer does not correspond to the management range of the user using the host computer.

13. The storage system configuration management system according to claim 11, wherein the RAID structure unit is an aggregate of the volumes capable of constituting at least one RAID structure.

14. The storage system configuration management system according to claim 12, wherein the RAID structure unit is an aggregate of the volumes capable of constituting at least one RAID structure.

15. The storage system configuration management system according to claim 11, wherein the CPU:
when the management range is partitioned for a plurality of users, displays the identifier of the volume that is a migration source candidate when migration is conducted to modify the management range of the user; and
removes the volume that is selected as the migration source from the RAID structure unit, so as to modify the management range of the user so that the remaining RAID structure unit constitutes a management range of the same user.

16. The storage system configuration management system according to claim 12, wherein the CPU:
when the management range is partitioned for a plurality of users, displays the identifier of the volume that is a migration source candidate when migration is conducted to modify the management range of the user; and
removes the volume that is selected as the migration source from the RAID structure unit, so as to modify the management range of the user so that the remaining RAID structure unit constitutes a management range of the same user.

17. The storage system configuration management system according to claim 11, wherein the CPU:
references a table storing a correspondence between an identifier of a system provided inside the storage system and an identifier of a user, and determines whether or not a user corresponding to a designated system is registered in the table;
when it is determined that the user is registered in the table, obtains the identifier of the user that is set in the storage system for the designated system;
determines whether or not the identifier of the user registered in the table and corresponding to the designated system, and the identifier of the user thus obtained match each other; and
when the identifiers of the users do not match each other with respect to the system, outputs the determination result.

18. The storage system configuration management system according to claim 12, wherein the CPU:
references a table storing a correspondence between an identifier of a system provided inside the storage system and an identifier of a user, and determines whether or not a user corresponding to a designated system is registered in the table;
when it is determined that the user is registered in the table, obtains the identifier of the user that is set in the storage system for the designated system;
determines whether or not the identifier of the user registered in the table and corresponding to the designated system, and the identifier of the user thus obtained match each other; and
when the identifiers of both users do not match each other with respect to the system, outputs the determination result.

19. The storage system configuration management system according to claim 11, wherein the system is one of a port operating as a communications interface to a host computer that accesses the first storage area in the storage system, and a cache partition relating to a cache that is a temporary storage system of the storage system.

20. A storage system configuration management system, comprising:
a management computer having a CPU, a memory and an interface connected to a network;
a plurality of storage systems having a processor, a memory, a plurality of volumes storing data, a first interface connected via a network to the management computer, and a plurality of second interfaces connected to a host computer via a network; and
a plurality of host computers connected to the second interface via a network for using the data,
wherein each of the storage systems holds, in the memory, storage system configuration information that associates a second interface connected via the host computer to a RAID structure unit, with a storage system user who manages the RAID structure unit, that is constituted by a plurality of storage areas provided to the storage system; and
wherein the management computer holds, in the memory, management information that associates a management group having at least one or more sets of the host computer and a plurality of volumes accessible by the host computer, the second interface for the host computer to access the volumes, and the user of the management group; and
wherein the CPU:
receives a designation of the RAID structure unit;
obtains, via the first interface, the storage system configuration information from the storage system to which the designated RAID structure unit belongs;
retrieves, from the management information, the management group to which the storage area included in the designated RAID structure unit belongs, based on the obtained storage system configuration information;
judges based on the result of the retrieval whether or not the user of the management group included in the retrieved management information, and the storage system user managing the designated storage area group, match each other, and when the result of the judgment indicates a mismatch, displays a screen indicating the mismatch;
when the result of the judgment indicates a match, further judges, based on the retrieved management information, whether or not any of the storage areas belonging to the management group matches a storage area in the designated RAID structure unit; and
when the judgment result indicates a mismatch, displays a screen indicating the mismatch;
wherein if mismatch is indicated, the user can select to change the storage configuration or to change the management group,
wherein the management range of a host computer does not correspond to the management range of the user using the host computer.

21. A management method of a computer system, the computer system including a storage system having storage units configured with logical volumes and host computers accessing the logical volumes via a network, the method comprising:

partitioning a plurality of the host computers into a plurality of groups as access management groups, each of the groups includes at least one of the host computers;

partitioning a plurality of the storage units of the storage system into a plurality of RAID structure unit as storage resource groups;

comparing one of the access management groups which includes one of the host computers recognizing the logical volumes with at least two of the storage resource groups including storage units configured with the logical volumes; and outputting results of the comparison as to whether the logical volumes provided with the host computers in one of the access management groups are in different storage resource groups, wherein if the users are different among the storage resource groups, further partitioning to the access management group occurs so that the user of the access management group is the same as the storage resource management group.

22. A management method of a computer system according to claim 21, further comprising:

setting a user to manage partitioned host computers in any of the access management groups;

setting a user to manage partitioned storage units in at least one of the storage resource groups;

referencing the users to be set among the access management group and the storage resource groups; and if the users are different among the storage resource groups, changing the user of the storage resource groups to be same as the user of the access management group.

23. A management method of a computer system according to claim 21, further comprising:

setting a user to manage partitioned host computers in any of the access management groups;

setting a user to manage partitioned storage units in at least one of the storage resource groups; and referencing the users to be set among the access management group and the storage resource groups.

* * * * *